Figure 1:
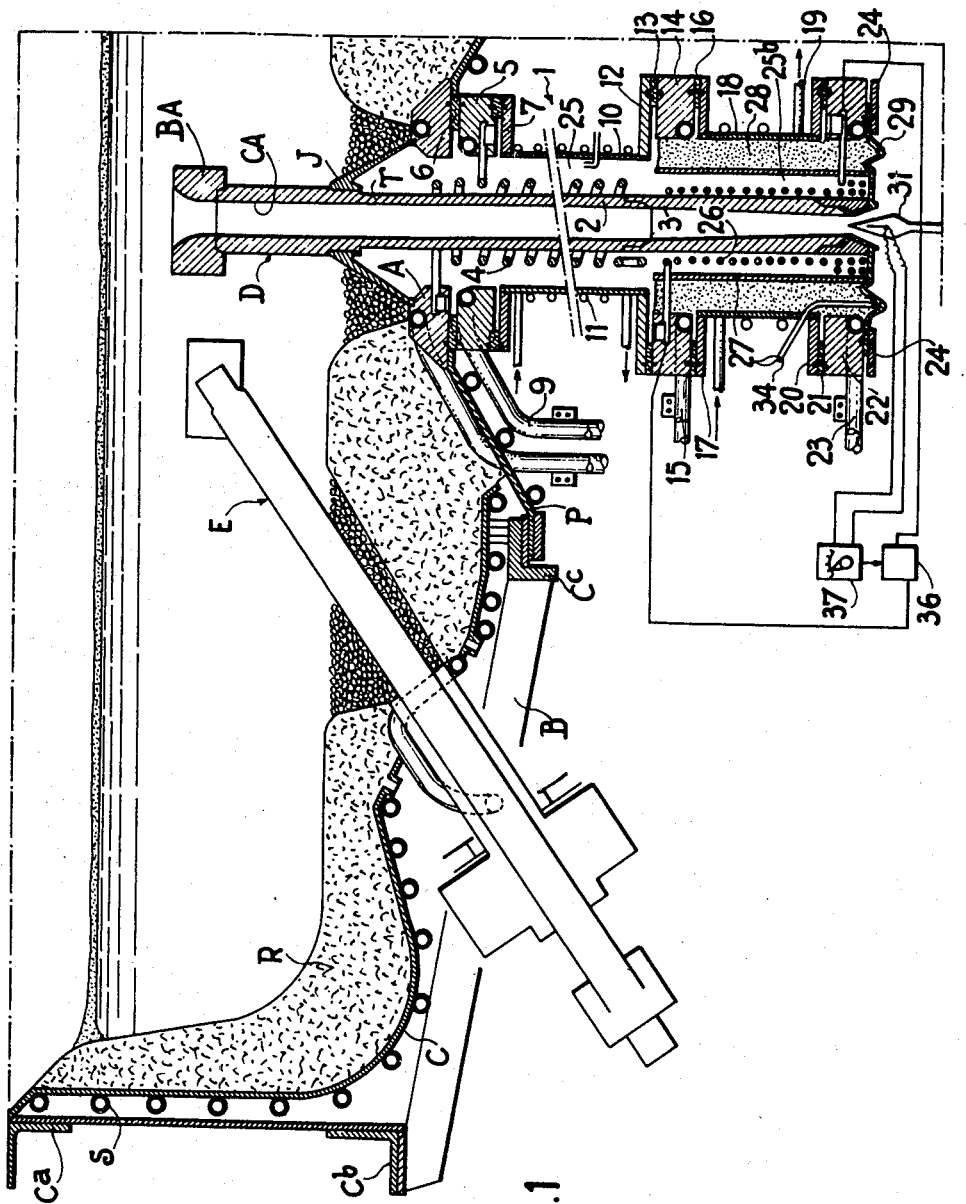

United States Patent

[11] 3,580,976

[72] Inventor: Jacques Marie Yves le Clerc de Bussy
Aumatre, 80 Oisemont, France
[21] Appl. No. 5,569
[22] Filed Jan. 26, 1970
[45] Patented May 25, 1971
[32] Priority Jan. 28, 1969
[33] France
[31] 6901615

[54] DEVICE FOR REGULATING THE TEMPERATURE OF GLASS AT THE OUTLET OF A VERY HIGH TEMPERATURE GLASS MELTING FURNACE
12 Claims, 2 Drawing Figs.

[52] U.S. Cl. .................................................. 13/6, 13/33, 65/326
[51] Int. Cl. .................................................. C03b 5/26, C03b 5/30
[50] Field of Search ................................. 13/6, 33; 65/326, 324

[56] References Cited
UNITED STATES PATENTS
1,622,666  3/1927  Peiler ........................... 65/327
2,830,107  4/1958  Hahn et al. .................... 13/33X Primary Examiner—Bernard A. Gilheany
Assistant Examiner—Roy N. Envall, Jr.
Attorney—J. Delattre-Seguy ABSTRACT: The regulating device provides at its outlet a glass whose temperature is adapted to the use of conventional feeders, notwithstanding the very high temperature prevailing in the furnace with which the device is associated. The glass flows through an extension which is surrounded by an enclosure which has, first, a heat-permeable wall for cooling the glass and, then, a heat-impermeable wall. A resistance corrects the temperature of the glass in the outlet by means of a control loop.

INVENTOR:
Jacques Marie Yves
 Le Clerc De Bussy
by: J. Delattre-Seguy
 Attorney

DEVICE FOR REGULATING THE TEMPERATURE OF GLASS AT THE OUTLET OF A VERY HIGH TEMPERATURE GLASS MELTING FURNACE

The present invention relates to the melting of glassware at very high temperature and more particularly to an electric melting furnace for glassware of the type comprising a tank in which there is a very high temperature gradient between a center zone and a peripheral zone and which comprises a molten glass extracting means located in the center of the tank and surrounded by melting electrodes, the extracting means comprising a vertical bored rod disposed on the axis of the tank. Such a tank is described in U.S. Pat. Nos. 3,147,328, 3,376,373 and 3,429,972.

Now, these furnaces deliver at their outlet a refined glass having a temperature of the order of 1,600° to 2,000° C., which is excessively high, at least for certain applications. In particular, when it is desired to employ a feeder from which the glass is distributed and worked after melting, considerable difficulties are met with since a feeder is usually designed for much lower temperatures, of the order of 1,350° C., at which the ceramic refractory elements forming the feeder are only very slightly altered by the product to be treated. On the other hand, glassware at 1,600°—2,000° C. rapidly destroys the refractory element unless special precautions are taken. These precautions are difficult to take and costly. Further, as the working temperature is generally 1,200° C., feeders having an excessive flow length have been constructed so as to suitably cool the product.

Another method known in conventional glass-making technique could be imagined for obtaining molten glass at the working temperature. This method is usually employed for rectangular base or tank melting furnaces. These furnaces are associated with a working tank in which the glass refined in the furnace is left at rest for a time so as to achieve the required purity and other like qualities. In these working tanks, the temperature of the glass also drops so that at the outlet the glass can be drawn off at a temperature of around 1,350° C., which is satisfactory for the feeders. Now, although the working tanks are suitable for use with a conventional tank furnace, they are hardly applicable to tank melting furnaces having a center extracting passage, a rough definition of which has just been given. First, the working tank is of refractory material and therefore rapidly deteriorates, if glass at 1,600°—2,000° C. is poured directly therein. Secondly, it takes up a great amount of space and the glass must stay in the tank for a long period. These factors are incompatible with relatively small tank furnaces in which the glass stays for only a few hours. Lastly, the tank furnace may be stopped at will whereas the working tank must continue to operate otherwise the refractory material would practically need replacement.

The object of the present invention is to provide a device for regulating the outlet temperature of a tank furnace which avoids the aforementioned drawbacks and is perfectly compatible with all the characteristics and advantages of tank furnaces disclosed in the aforementioned patents and addition.

The invention provides a device for regulating the temperature of a continuous glass stream at the outlet of an electric melting furnace of the type comprising a tank in which prevails a very high temperature gradient between a center zone and a peripheral zone and in which is disposed in the center of the tank a molten-glass-extracting means which is surrounded by melting electrodes and comprises a bored vertical rod placed on the axis of the tank, wherein said vertical rod comprises a tubular extension of a highly refractory metal, such as molybdenum and tungsten, through which the glass stream flows and which is surrounded by an annular enclosure defined in the upper part thereof by a heat-permeable wall for reducing the temperature of the stream of glass to a value slightly below a predetermined temperature, the enclosure being defined in the lower part thereof by a heat-impermeable wall, a heating element being disposed in said lower part of the enclosure, the supply of heat by said heating element being governed by the difference between the temperature of the stream of glass flowing in said extension and a predetermined temperature, said difference controlling the viscosity and consequently the flow of the glass.

This arrangement affords a homogeneous unit for producing a continuous stream of molten glass which can be employed at the desired temperature in conventional feeders. This unit thus affords a production unit comprising the melting furnace, a part lowering the temperature and a device whereby it is possible, owing to a judicious and precise regulation at the outlet of the unit, to set exactly the temperature and flow of the glass obtained.

As the extension of the extracting rod communicates with the exterior solely by way of the outlet orifice, the glass is obtained without coming in contact with the surrounding air during the regulation of the temperature thereof. This precludes escape of the volatile components of the glass at high temperature and the chemical and physical properties, and in particular the homogeneity of the glass, are wholly retained.

According to another feature of the invention, the portion of said tubular extension which extends through said upper part of the enclosure is surrounded by a heating element.

By means of this heating element and the element which surrounds the lower part of the extension, it is possible to initiate the pouring of the glass after stoppage of the furnace merely by supplying the heating elements with current and heating the tubular extension.

According to another feature of the invention, a tapered valve member is located in the outlet orifice of the tubular extension, its shape matching the shape of the outlet orifice and the valve member being vertically movable so as to define a flow passage which is adjustable as a function of the characteristics of the glass melted in the furnace.

A temperature-responsive element, such as a thermocouple, can be incorporated in said valve member and this temperature-responsive element is connected to a control loop whose output supplies power to said heating element surrounding the lower part of the extension, so that the supply of energy to the heating element is controlled by the difference between the temperature measured by said temperature-responsive element and the fixed temperature and consequently by the viscosity of the glass flowing through said extension.

It is indeed known that the temperature of glassware governs its viscosity and consequently its flow through a passage of given size. Owing to the aforementioned feature, a very precise regulation of its flow is achieved by acting on the supply of heat to the part of the flow or stream of glass directly upstream of the outlet orifice of the tubular extension.

According to another feature of the invention, said enclosure is filled with a reducing gas, such as hydrogen, supplied at a pressure slightly higher than atmospheric pressure so as to protect the outer face of the metal (molybdenum) of the extracting passage against oxidation. The excess reducing gas is taken off at the lower end of the enclosure where it is burnt by means of a cresset or torch.

The inner face of the extracting passage is protected by the glass itself, whereas a platinum sleeve extends this wall at the lower end. The platinum of this sleeve cannot deteriorate owing to the fact that the glass has a temperature of about 1,400° C. at this level.

Consequently, all the components defining the passage are protected against oxidation both internally and externally, throughout the length thereof.

Further features and advantages of the invention will be apparent from the ensuing description with reference to the accompanying drawings.

Figure 2:
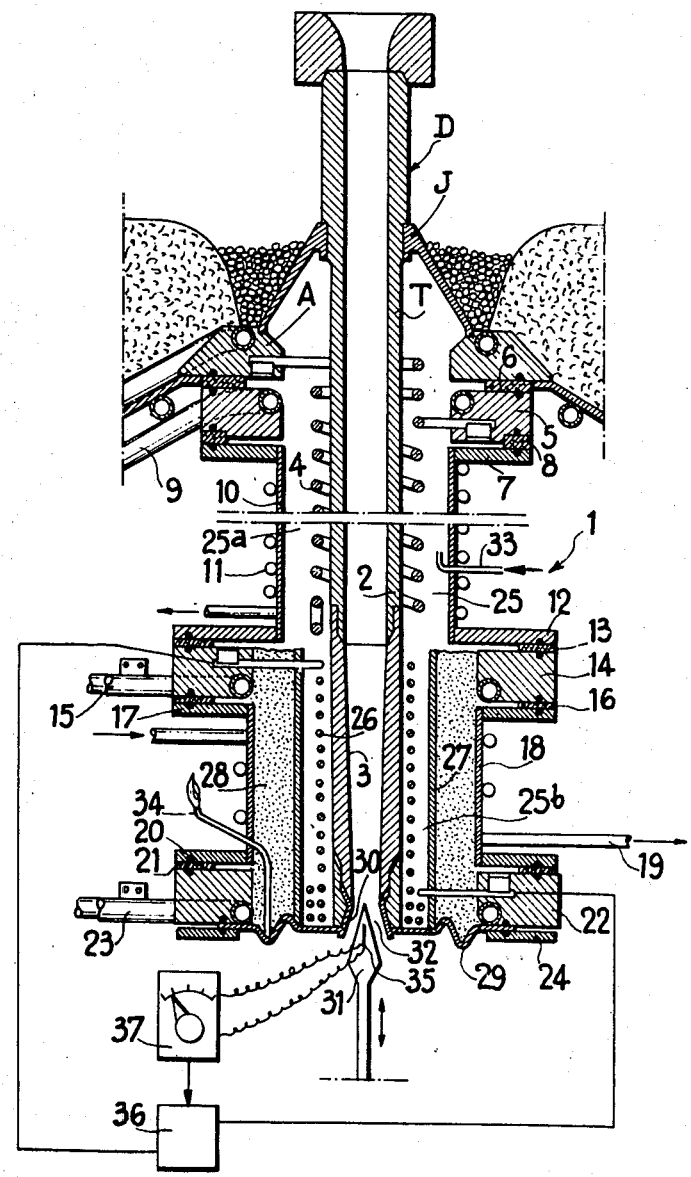

In the drawings:

FIG. 1 is a partial vertical sectional view of a melting furnace provided with a regulating device according to the invention, and FIG. 2 is a sectional view of the lower part of this device, to an enlarged scale.

According to the illustrated embodiment, the electric melting furnace comprises a circular tank C, for example of red copper, mounted on a frame comprising in particular two circular outer L-section members $c^a$ and $c^b$, a circular inner L-section member $c^c$ and radial connecting arms B, the assembly resting on the ground in a suitable manner (not shown). The tank C is cooled by means of a nest of tubes S which are brazed to the outer face of the tank and through which flows a cooling liquid, such as water. The inner face of the tank is covered by a refractory lining R.

The furnace is provided with three electrodes E, only one of which is shown in the drawing, these electrodes being arranged radially about the center of the tank with an angular spacing of 120°. An extracting device D is disposed in the center of the tank.

In the known manner, the extracting device bears on a cylindrical skirt J whose lower edge bears on a cooled ring A of brass for example. The latter is fixed to a cooled plate P of red copper which is secured to the member $c^c$ integral with the frame of the furnace.

The regulating device according to the invention, generally designated by the reference numeral 1, is suspended below the furnace in coaxial relation to the axis of the tank C. It has in the center thereof a very elongate tubular extension 2 which is of highly refractory metal, such as molybdenum, and is in one piece with a rod T forming with an extracting member BA the extracting device D known per se. The tubular extension 2 can comprise a number of sections and is provided with a bore or passage 3 in the extension of the extracting passage CA of the refining device D.

The lower end of the rod T and a part of the tubular extension 2 are surrounded by a heating resistance 4 which is coiled into a double helix and whose ends are respectively fixed in the ring A and in an annular support 5, for example of brass, which is separated from the ring A by an insulating gasket 6 and from a fixing flange 7 by another insulating gasket 8. A coil of cooling pipe 9 extends through the brass support.

The fixing flange 7 is integral with an elongated copper tube 10 having a suitable length and cooled by a coil of cooling pipe 11 in which also flows a cooling liquid. The lower edge of the tube 10 is integral with another fixing flange 12 to which the lower part of the regulating device is secured. This device comprises an insulating gasket 13, a brass ring 14 cooled by a coil of cooling pipe 15, an insulating gasket 16, a flange 17, a copper tube 18 cooled by a coil of cooling pipe 19, a flange 20, an insulating gasket 21, a brass ring 22 cooled by a coil of cooling pipe 23, and an end plate 24.

The annular arrangement described up till now defines around the extension 2 and the lower end of the center rod T, an enclosure 25 mainly comprising two parts or portions $25^a$, $25^b$, the length of the upper part $25^a$ substantially corresponding to the length of the heating resistance 4.

The lower part $25^b$ of the enclosure 25 is distinctly shorter than the upper part $25^a$. It encloses a helical or coiled heating resistance 26 one end of which is fixed to the ring 14 whereas the other end, comprising a plurality of double coils, is electrically connected to the ring 22. The heating resistance is surrounded by a tubular screen 27 which defines with the tube 18 an annular space filled with a heat-insulating material 28 such as small hollow aluminum balls having a diameter of 2 mm. or any other suitable insulating material.

A platinum expansion joint 29 is clamped by its peripheral edge portion between the ring 22 and the end plate 24. The expansion joint comprises a corrugated portion which serves to accommodate expansion of the tubular extension 2 when the temperature of the furnace rises.

A platinum tapered member 30 is integral with the expansion joint and thus shields the lower end of the tubular extension off from the oxygen of the air. The tapered member is downwardly divergent and matches the shape of a flow-regulating tapered or part-conical plug or valve member 31 which defines an outlet passage 32 of given adjustable size, the valve member being mounted in such manner as to be adjustable in height.

The enclosure is permanently filled with hydrogen by way of a pipe 33 at a pressure slightly higher than atmospheric pressure, the excess hydrogen being burnt at the end of the pipe 34 which constitutes a cresset which draws this gas from the base of the assembly. Thus, the entire outer face of the rod T and of the tubular extension 2 of molybdenum is protected from oxygen which would rapidly deteriorate this metal if these parts were exposed to the air.

The valve member 31 provided with a thermocouple 35 which measures the temperature of the glass at the outlet of the extension 2. This thermocouple is part of a control loop, the signal produced by this thermocouple being applied to a control circuit 36 to which is connected a regulator 37 whereby a reference value for the temperature can be fixed. The control circuit 36 controls the intensity of the current in the heating resistance 26 as a function of the difference between the set temperature and the actual temperature prevailing in the passage 32. In this way, the viscosity and consequently the flow of the product issuing from the apparatus is controlled in a very precise manner.

A cooling liquid, for example water, passes through all the coils of cooling pipe which can be connected in accordance with one or more circuits and supplied by a pump (not shown).

The heating resistances 4 and 26 are supplied with 8—10 volt alternating current. The resistance 26 supplies a greater amount of heat at its lower end so as to compensate for losses by infrared radiation near the outlet of the tubular extension 2.

The various parts of the apparatus are assembled in an appropriate manner, as by screw and bolt assemblies which are electrically insulated. They have not been shown in order to render the drawing more clear. The assembly is sealed by sealing means provided in the appropriate places to preclude leakage of hydrogen.

Before starting up the furnace after a previous period of utilization, the glass is in the solidified state in the passage 3. To melt the amount of glass thus accumulated, voltages are applied across the resistances 4 and 26 at the same time as the other operations for starting up the furnace are carried out. The voltages are applied across the resistances 4 and 26 respectively through the ring A and the annular support 5 and through the rings 14 and 22.

The heat generated in the resistances is communicated to the walls of the passage 3 and the glass starts to melt. At the end of a certain period of time the glass starts to flow. The resistance 4 can then be switched off.

The valve member 31 can be adjusted in height as a function of the particular characteristics of the glass being melted and of the capacity of the feeder and of other apparatuses in which the product is subsequently treated. A reference temperature is also set by means of the regulator 37 so as to determine the required viscosity, and consequently the desired flow of the glass in the passage 3, the melting capacity of the furnace itself also being taken into account.

If desired, it is possible to introduce in this regulation of the temperature another parameter such as a temperature which is a function of the level of the product in the feeder.

When the normal flow has been reached, the temperature is regulated in a continuous manner by means of the resistance 26. The glass enters the extracting device BA at very high temperature and flows down the passage 3 where it is first subjected to a cooling, in that it communicates a part of its heat to the tubular extension 2 which is thereafter dissipated by radiation through the tube 10 and absorbed by the coil of cooling pipe 11. If desired, the resistance 4 can afford a temperature correction by remaining connected to a very low regulated voltage.

At the level of the lower part $25^b$ of the enclosure, where the resistance 26 starts, the glass has a temperature slightly lower than that desired at the outlet. A temperature correction is then afforded by the control circuit which controls the energy consumed by the resistance 26. Owing to the fact that the lower part 25$^b$ of the enclosure is heat insulated by the screen 27 and the insulating material 28, the temperature of the glass is practically determined by the supply of heat by the resistance 26.

In this way, there is obtained a glass having a homogeneity superior to that of glass obtained with known apparatuses, since in the device according to the invention volatilization of some of these elements cannot occur as the product is never in contact with the surrounding air at high temperature. Moreover, owing to a progressive and slow cooling of the product in the passage 3 immediately following on the melting, the quality of the product obtained is also improved.

Although a specific embodiment of the invention has been described, many modifications and changes may be made therein without departing from the scope of the invention.

Having now described my invention what I claim and desire to secure by Letters Patent is:

1. A device for regulating the temperature of a continuous glass stream at the outlet of an electric melting furnace comprising a tank having an axis and in which prevails a very high temperature gradient between a center zone and a peripheral zone, molten glass-extracting means disposed in the center of the tank, glass-melting electrodes surrounding the extracting means, the glass-extracting means comprising a bored vertical rod placed on the axis of the tank, said vertical rod comprising a tubular extension of a highly refractory metal and having an outlet orifice through which the glass stream flows, an annular enclosure surrounding the rod and defined in the upper part of the enclosure by a heat-permeable wall for reducing the temperature of the stream of glass to a value slightly below a predetermined temperature, the enclosure being defined in the lower part thereof by a heat-impermeable wall, a heating element located in said lower part of the enclosure, and means for controlling the supply of heat by said heating element in accordance with the difference between the temperature of the stream of glass flowing in said extension and a predetermined temperature, said difference controlling the viscosity and consequently the flow of the glass issuing from the melting furnace.

2. A device as claimed in claim 1, wherein said enclosure is filled with a reducing gas supplied at a pressure slightly higher than atmospheric pressure, excess of this gas being taken off at the lower end of the enclosure.

3. A device as claimed in claim 1, wherein a sleeve of platinum extends the wall of said extracting passage at the lower end of said extension so as to protect the material of the extension from oxidation.

4. A device as claimed in claim 1, comprising a heating element surrounding the portion of said tubular extension which extends through said upper part of the enclosure.

5. A device as claimed in claim 1, comprising a valve member located in the outlet orifice of said tubular extension and having a shape matching the shape of the outlet orifice, and means for adjusting the valve member in height so as to define a flow passage whose size is adjustable as a function of the characteristics of the glass melted in the furnace.

6. A device as claimed in claim 5, wherein a heat-responsive element is incorporated in said valve member, said responsive element being connected to a control loop having an output which supplies power to said heating element located in said lower part of the enclosure.

7. A device as claimed in claim 1, comprising a metal tube defining the upper part of said enclosure, and means for cooling said tube.

8. A device as claimed in claim 7, wherein said cooling means comprise a coil of cooling pipe adapted to receive a cooling liquid.

9. A device as claimed in claim 1, comprising a structure defining the lower part of the enclosure, said structure including an annular inner chamber and a heat-insulating material in said inner chamber.

10. A device as claimed in claim 9, wherein said heat-insulating material comprises a mass of hollow aluminum balls of small diameter.

11. A device as claimed in claim 1, comprising an expansion joint closing the lower end of the enclosure, the expansion joint being fixed to an end of said tubular extension and to a fixed part of the regulating device.

12. A device as claimed in claim 5, wherein said outlet orifice is downwardly divergent and has a conicity matching the conicity of said valve member.